(12) United States Patent
Yih et al.

(10) Patent No.: US 8,996,515 B2
(45) Date of Patent: *Mar. 31, 2015

(54) CONSISTENT PHRASE RELEVANCE MEASURES

(75) Inventors: Wen-tau Yih, Redmond, WA (US); Christopher A. Meek, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 305 days.

This patent is subject to a terminal disclaimer.

(21) Appl. No.: 13/609,257

(22) Filed: Sep. 11, 2012

(65) Prior Publication Data

US 2012/0330978 A1    Dec. 27, 2012

Related U.S. Application Data

(63) Continuation of application No. 12/144,647, filed on Jun. 24, 2008, now Pat. No. 8,290,946.

(51) Int. Cl.
*G06F 7/00* (2006.01)
*G06F 17/30* (2006.01)
*G06Q 30/02* (2012.01)

(52) U.S. Cl.
CPC .......... *G06F 17/30687* (2013.01); *G06Q 30/02* (2013.01)
USPC ............ 707/728; 707/708; 707/749; 707/765

(58) Field of Classification Search
None
See application file for complete search history.

(56) References Cited

U.S. PATENT DOCUMENTS

| | | | | | |
|---|---|---|---|---|---|
| 5,675,710 | A | * | 10/1997 | Lewis | 706/12 |
| 6,006,221 | A | * | 12/1999 | Liddy et al. | 1/1 |
| 6,026,388 | A | * | 2/2000 | Liddy et al. | 1/1 |
| 6,728,690 | B1 | * | 4/2004 | Meek et al. | 706/25 |
| 7,269,598 | B2 | * | 9/2007 | Marchisio | 1/1 |
| 7,440,947 | B2 | * | 10/2008 | Adcock et al. | 1/1 |
| 7,451,124 | B2 | * | 11/2008 | Handley | 706/45 |
| 7,814,086 | B2 | * | 10/2010 | Bartz et al. | 707/708 |
| 2003/0217066 | A1 | * | 11/2003 | Kayahara | 707/100 |
| 2005/0234953 | A1 | * | 10/2005 | Zhang et al. | 707/101 |
| 2006/0117228 | A1 | * | 6/2006 | Theimer et al. | 714/45 |
| 2007/0174255 | A1 | * | 7/2007 | Sravanapudi et al. | 707/3 |
| 2008/0195595 | A1 | * | 8/2008 | Masuyama et al. | 707/5 |
| 2009/0077073 | A1 | * | 3/2009 | Masuyama et al. | 707/6 |

* cited by examiner

*Primary Examiner* — Robert W. Beausoliel
*Assistant Examiner* — Hexing Liu
(74) *Attorney, Agent, or Firm* — Sandy Swain; Judy Yee; Micky Minhas

(57) ABSTRACT

Two methods for measuring keyword-document relevance are described. The methods receive a keyword and a document as input and output a probability value for the keyword. The first method is a similarity-based approach which uses techniques for measuring similarity between two short-text segments to measure relevance between the keyword and the document. The second method is a regression-based approach based on an assumption that if an out-of-document phrase (the keyword) is semantically similar to an in-document phrase, then relevance scores of the in and out-of document phrases should be close to each other.

13 Claims, 5 Drawing Sheets

CONSISTENT PHRASE RELEVANCE MEASURES

RELATED APPLICATIONS

This application is a Continuation of prior application Ser. No. 12/144,647, filed Jun. 24, 2008. The aforementioned application Ser. No. 12/144,647 is incorporated herein by reference.

BACKGROUND

Techniques related to measuring how relevant phrases are to a document are described herein. Such measurement may be described mathematically; given a document d and a keyword k, there is a probability p(k|d), which is the probability that k is relevant to d. This measurement of keyword-document relevance can be useful for many applications, including automatically selecting online advertisements, verifying relevance of a phrase to a sponsored ad (whether on-line or off-line), verifying whether a keyword or query is relevant to a web page, or verifying whether a new keyword is relevant to a given content page.

While relevancy measurement in general is well known, there is need to measure relevancy of a phrase to a document when the phrase is not found in the document. These phrases are referred to as out-of-document phrases. Techniques described below relate to finding measures of relevance of phrases to a document when the phrases are not found in the document. The techniques may also involve measuring such relevancies in ways that allow them to be meaningfully compared with relevancies of phrases found in the document.

SUMMARY

The following summary is included only to introduce some concepts discussed in the Detailed Description below. This summary is not comprehensive and is not intended to delineate the scope of the claimed subject matter, which is set forth by the claims presented at the end.

Two methods for measuring keyword-document relevance are described. The methods receive a keyword and a document as input and output a probability value for the keyword. The first method is a similarity-based approach which uses techniques for measuring similarity between two short-text segments to measure relevance between the keyword and the document. The second method is a regression-based approach based on an assumption that if an out-of-document phrase (the keyword) is semantically similar to an in-document phrase, then relevance scores of the in and out-of document phrases should be close to each other.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Figure 2:
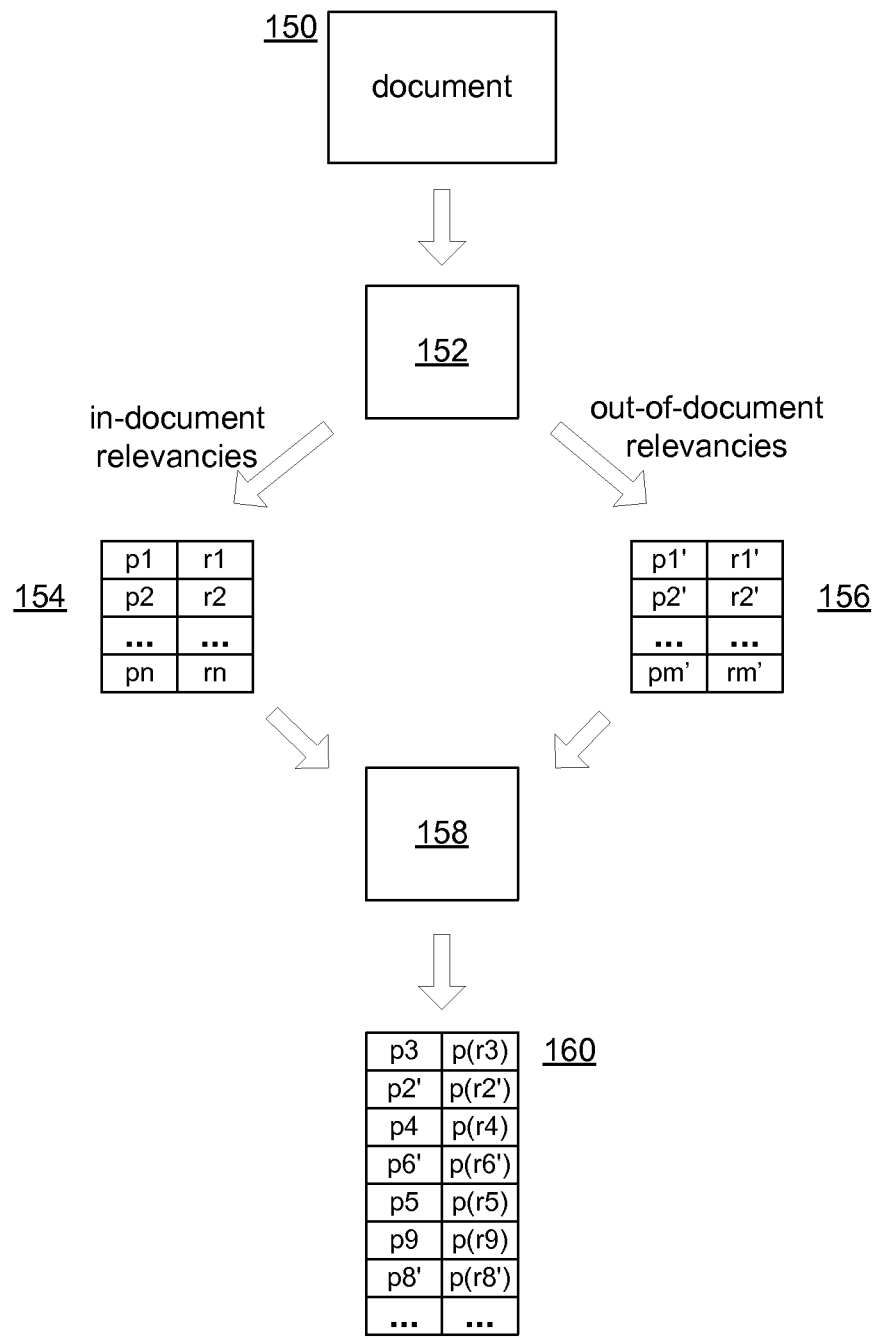
FIG. 2 shows a document analyzed for phrase relevancy.

Embodiments discussed below relate to consistent phrase relevancy measures, where consistency refers to allowing comparison of in and out-of document relevancies (see FIG. 2, discussed later). Two methods for measuring keyword document relevance are described. The methods receive a keyword (a phrase that comprises one or more words) and a document as input and output a probability value for the keyword. For ad relevancy problems, a probability of the relevance of a keyword to an ad landing page is returned. If the probability is below a threshold, the ad is considered irrelevant and is therefore bypassed. In the contextual advertising scenario, keywords from different sources—such as those output by an automatic keyword extractor or those supplied by a publisher—can be evaluated using the methods. Probabilities predicted for these keywords can be used to rank the keywords, and top relevant keywords can be used for various purposes including online search and advertising.

Measuring the relevance between a document and a phrase is useful for many information retrieval and matching tasks, including on-line advertising. The two approaches described herein are for measuring the relevance between a document and a phrase (even if the phrase is not in the document) while providing consistency between relevance scores for both in and out-of document phrases. That is, in and out-of document relevancies can be meaningfully compared or can be joined. The first approach is a similarity-based method which represents both the document and phrase as term vectors to derive a real-valued relevance score. The second approach takes as input the relevance estimates of some in-document phrases and uses Gaussian Process Regression (GPR) to predict the score of a target out-of-document phrase.

Applications for Out-of-Document Phrase Relevance

As mentioned above, consistent measures for phrase-document relevance can be useful. Consider two applications that benefit from extending an in-document relevance measure to handle out-of-document phrases. These two example applications relate to online advertising, where the selection of ads to be shown is primarily driven by phrases (bidden-for keywords) selected by an advertiser.

Figure 1:
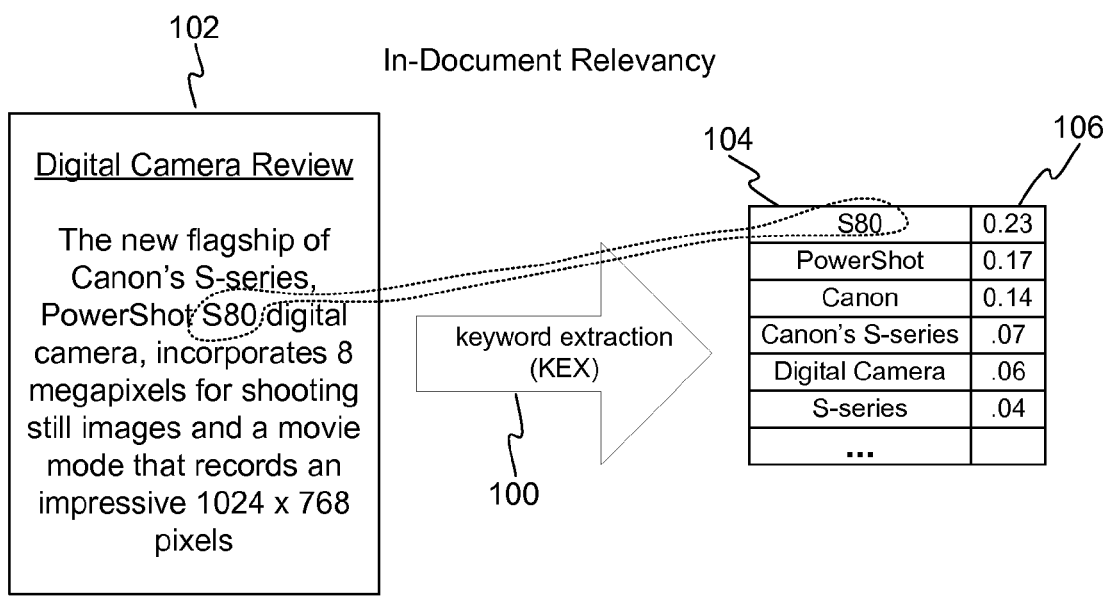
FIG. 1 shows use of a keyword extractor (KEX) algorithm.
Figure 5:
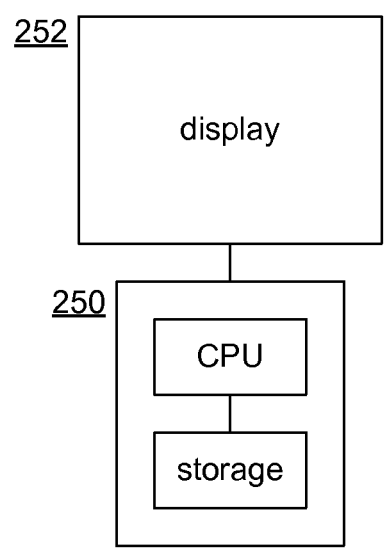
FIG. 5 shows a computing device.

In the area of contextual advertising, phrases in a web page may be identified as relevant keywords by a keyword extraction (KEX) algorithm. FIG. 1 shows use of a keyword extractor (KEX) algorithm 100 (in practice implemented with a computing device as shown in FIG. 5). An input document 102 is analyzed by the KEX algorithm 100. Identified phrases 104 are extracted along with probabilities 106 of relevancy to the document 102. The identified phrases 104 may be used to select an appropriate contextual ad. This approach, however, limits the potential matching bid keywords to phrases that appear in the document (e.g., "S80"). By extending relevance measure from only in-document relevancy to include out-of-document relevancy measure it is possible to broaden the range of potentially relevant ads for a particular context. Potential alternative phrases might come from different sources such as query suggestion systems or content publishers. For example, an online sports publication might want an advertising platform to consider showing ads for generic keywords such as "MLB" or "NFL" on all of the publisher's pages, regardless of whether the added keyword occurs in the document. To relate this to out-of-document relevancy, consider the following scenario. Suppose ESPN.com would like to use the keyword "MLB" to match ads on all pages of its website. A page that describes the latest NBA scores that does not contain "MLB" (an out-of-document keyword) should be assigned a low relevancy score to "MLB". On the other hand, another page talking about baseball should consider "MLB" as a highly relevant keyword regardless of whether "MLB" occurs in the page or not.

Another application of out-of-document relevancy measures in the domain of sponsored search advertising is automated relevance verification of bid keywords. In this application, the measures are used to verify the relevance of keywords to an ad landing page when an advertiser bids on a set of keywords. By excluding some unrelated keywords the searcher's experience can be improved by reducing the number of irrelevant ads.

Regarding another application, consider that when ranking query results it is difficult to provide mutually consistent relevance measures for both in and out-of document phrases. For example, if a document contains the phrase "Major League Baseball" but not "MLB", these phrases would have very different relevancy scores even though they are synonymous.

In light of these problems and others, two approaches are described herein: a similarity-based approach and a regression-based approach. The first approach uses techniques for measuring similarity between two short-text segments to measure relevance between a phrase and a document. More specifically, and as discussed in detail later, this approach may involve query expansion based on pseudo-relevance feedback using the World Wide Web as an external data source. In contrast to traditional query expansion, however, query expansion may be used to identify a set of related words to represent the semantics of the query phrase. Ideally, two synonyms such as "MLB" and "Major League Baseball" will be represented by similar vectors and thus have similar relevance scores when compared against the same document.

One potential drawback of the similarity-based approach mentioned above is that some document-specific information (e.g., whether a phrase appears in anchor text or the document's title) might not be leveraged to more accurately compute relevance measures for in-document phrases. The second approach, described below, may take better advantage of such document-specific information. This second approach may involve using a regression model to use the results of an accurate in-document phrase relevance measure to predict out-of-document phrase relevance. Conceptually, this approach first uses an in-document phrase relevance module to judge the relevance scores for some in-document phrases. Then, a measure of similarity (a similarity function) between in and out-of document phrases is used to predict the relevance of an out-of-document phrase. For instance, if the in-document phrase is "Major League Baseball" and the similarity function indicates that it is synonymous with the out-of-document phrase "MLB", then the predicted relevance scores for the two phrases would be the same. The similarity between the in and out-of document phrases may be based on the query expansion similarity technique mentioned above, while using Gaussian Process Regression (GPR) as the regression technique.

The following description will begin with explanation of general underlying techniques for relevancy measurement, including measuring in-document phrase relevance using keyword extraction and query expansion, and using the Web as a main document source. Following the next section, the similarity-based and regression-based methods will be described in more detail.

Relevancy Measurement Overview

Given a phrase ph (the term "phrase" is used herein to indicate a short sequence of one or more words) and a document d, a goal is to obtain a real-valued measure of their relevance. To find a relevance measure (and in particular a probabilistic relevance measure) it may be helpful to specifically estimate the probability that a hypothetical human annotator would label the phrase ph as relevant to the document d. The two approaches to this problem (similarity-based and regression-based) may be used to obtain mutually comparable or consistent in and out-of document relevancies for a same document. A module 152, implementing a combination of relevancy techniques described herein, computes in-document relevancies 154 and out-of-document relevancies 156. Another module 158, implementing a function such as a sigmoid function described below, in a consistent way, maps the FIG. 2 shows a document 150 analyzed for phrase relevancy.relevancies 152, 154, to probabilities 160. For example, p(r4) is the probability that phrase p4, according to its relevancy measure r4, is relevant to document 150).

Figure 3:
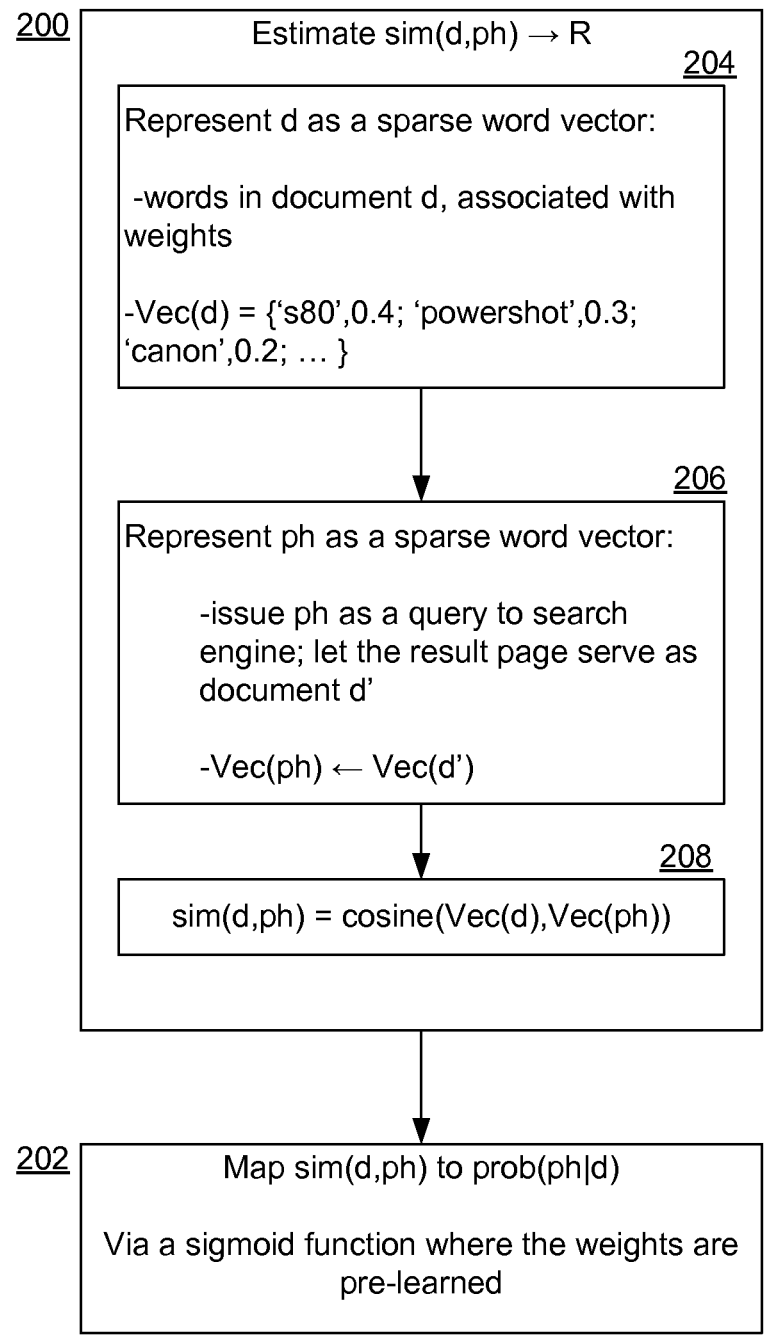
FIG. 3 shows a similarity-based process.

FIG. 3 shows a similarity-based process. The similarity-based method involves two main steps: estimating similarity 200 and mapping 202 similarity to probability. To estimate similarity 200, the process represents 204 $d$ as a sparse word vector, where words in d are associated with weights. Further to estimating similarity 200, the process also represents 206 the target phrase (ph) as a sparse word vector (a vector of semantically similar terms) generated via query expansion using the Web as an external source (i.e., a document dataset). A real-valued raw similarity score is then assigned 208 by comparing this vector with another term vector that is derived from the target document. A probability of the phrase being relevant to the document can be estimated by calibrating or mapping 202 the raw similarity score with a learned sigmoid function.

Figure 4:
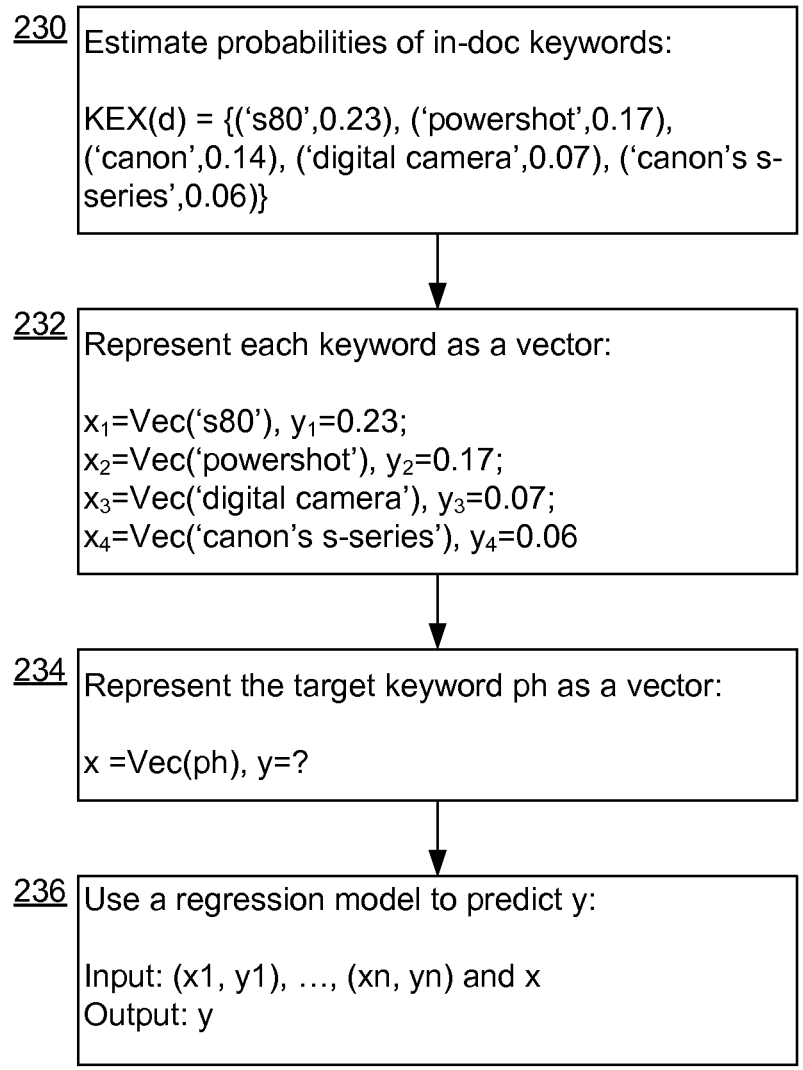
FIG. 4 shows a regression-based method.

FIG. 4 shows a regression-based method. The regression-based method separates the in and out-of document phrases. The relevance of an in-document phrase can be estimated directly by a separate component that uses document-specific information that relates to the phrase (e.g., does the phrase appear in the document's title?). For an out-of-document phrase, if the phrase is similar to an in-document phrase, the relevance scores of these two phrases should be close to each other. More specifically, probabilities of in-document keywords are estimated 230. Each keyword is represented 232 as a vector. The target keyword or phrase ph is also represented 234 as a vector 234. A regression model is used to predict 236 the relevancy.

Both approaches can be implemented with three underlying techniques: measuring in-document phrase relevance; projecting documents into a vector space; and expanding a phrase to a pseudo-document via query expansion. These techniques are now explained.

Regarding measuring in-document phrase relevance, for a phrase ph that occurs in the document d, an in-document phrase relevance measure maps ph and d to a real number and can be denoted as Rel(ph, d)→R. Techniques such as basic TFIDF formulas and the BM25 ranking function may be used for this kind of in-document relevancy measurement. In-document phrase relevance measurement can also be used for keyword extraction (KEX). As discussed earlier with reference to FIG. 1, KEX takes as input a target document and outputs short phrases in the document that are relevant to the content as the selected keywords. In addition to KEX ($\text{Rel}_{KEX}$), other in-document phrase relevance measures may be used, for example a TFIDF formula ($\text{Rel}_{TFIDF}$) or a uniform weighting function ($\text{Rel}_{BIN}$) may be used. For $\text{Rel}_{KEX}$, a keyword extraction component can be programmed according to "Finding advertising keywords on web pages" (W. Yih, J. Goodman, and V. Carvalho, *In Proc. of WWW—06*, 2006), which describes a keyword extraction system trained using more than 10 categories of features. Three most notable features thereof are: term frequency (TF), document frequency (DF), and search query log. TF can be treated as a document-dependent feature which provides a rough estimate of how important the target phrase is relative to the whole document. DF and search query log can be viewed as document-independent features. The former downweights stopwords and common phrases in the document collection and the latter upweights phrases that are frequently queried. This model is trained using logistic regression and therefore its output can be used as probability directly. For $\text{Rel}_{TFIDF}$, the following TFIDF formula may be used:

$$w_i = tf_i \times \log(N/df_i), \quad (1)$$

where N is the total number of documents when counting document frequency. Finally, $\text{Rel}_{BIN}$ simply assigns 1 as the relevance score of an in-document phrase. With this baseline approach in mind, consider how documents can be projected into vectors.

Regarding the projection of documents into vectors, both documents and phrases are represented as vectors for further processing. A document d is mapped to a sparse term vector, where each term is a word and is associated with a weight that indicates the relevance of the word to d. The term-weighting functions used for this vector projection process can be any of the in-document phrase relevance measures mentioned above (e.g., $\text{Rel}_{TFIDF}$), followed by L2 normalization. Put another way:

1. construct the sparse term vector v, where each element is $w_j$ (the j-th word in the document d), with a real-valued weight $\text{Rel}(w_j, d)$; and
2. apply L2 normalization on v, where the final output vector, $\text{Vec}(d)$, is $v/\|v\|$.

The projection function can be denoted according to the term-weighting function. For example, $\text{Vec}_{KEX}$, $\text{Vec}_{TFIDF}$ and $\text{Vec}_{BIN}$ mean that the in-document phrase relevance functions, $\text{Rel}_{KEX}$, $\text{Rel}_{TFIDF}$, and $\text{Rel}_{BIN}$ are used for term-weighting, respectively. When mapping a phrase to a vector, a query expansion technique (described next) is first used to construct a pseudo-document, before applying the above vector projection method.

Regarding query expansion, when measuring the similarity between a phrase and a document (used in the similarity-based methods) or when measuring the similarity between two phrases (used in the regression-based methods), there may be little orthographic (literal) similarity between the phrases. Naively relying on co-occurrence of the words in the target phrases leads to unreliable and low-quality similarity measures. Therefore, an input phrase can be handled by representing it as a pseudo-document using query expansion. Generally, query expansion is a procedure that treats a target phrase as a search query and represents it as a set of semantically related words. The Web may be used as the document source and pseudo-relevance feedback can be used for this expansion (see "A probabilistic model of information retrieval: development and comparative experiments—parts 1 & 2", K. Sparck Jones, S. Walker, and S. E. Robertson, *Information Processing and Management*, 36(6), 2000). The process of mapping a phrase to a pseudo-document, denoted as $\text{Web}_{QE}$, may involve:

1. letting $D_n(\text{ph})$ be the set of top n documents returned by a search engine when using phrase ph as the query; and
2. constructing a pseudo-document $\text{WebQE}(\text{ph})$ by concatenating the title and short summary of each document $d_i \in D_n(x)$.

In other words, the top n search results of the titles and summaries are treated as relevant text to the phrase. Note that titles, short summaries, and similar information will be referred to as metadata about the documents. Experiments have shown that a practical value for n is 50.

Similarity-Based Approaches

Similarity-based approaches (for example the process of FIG. 3) described next may involve some aspects of methods for measuring similarity between short text segments. Both the phrase and document may be represented as non-negative vectors and their cosine score may be used as a raw relevance score. When a probabilistic relevance measure is preferred, a parameterized sigmoid function is learned using held-out data and the raw score is mapped to a probability. The sigmoid function can also be used as a tool to combine multiple relevance scores and yield not only a better probability estimation but also superior ranking results. These steps are now described in more detail.

Measure Phrase Document Similarity

Aspects of techniques for measuring similarity of short text segments, such as ("A web-based kernel function for measuring the similarity of short text snippets", M. Sahami and T. Heilman, *In Proc. of WWW—06*, 2006.; and "Improving similarity measures for short segments of text", W. Yih and C. Meek, *In Proc. of AAAI '07*, 2007) are used to measure the similarity between a phrase and a document, which is used as a relevance measure. When measuring the similarity between two phrases $\text{ph}_1$ and $\text{ph}_2$, query expansion is applied and then a term-weighting function is used to represent the input phrases as two vectors. Their inner-product is output as the similarity score.

The similarity score can be formulated as $\text{Vec}(\text{WebQE}(\text{ph}_1)) \cdot \text{Vec}(\text{WebQE}(\text{ph}_2))$. When comparing a phrase ph and a document d, the same strategy can be followed; the inner-product, $\text{Vec}(\text{WebQE}(\text{ph})) \cdot \text{Vec}(d)$, is used as the relevance score. As mentioned earlier, various different term-weighting functions can be used. Consider these similarity measurement functions:

1. $\text{SimBin}(\text{ph}, d) = \text{Vec}_{BIN}(\text{WebQE}(\text{ph})) \cdot \text{Vec}_{cBIN}(d)$, where the words in the document are weighted equally and so are the words in the phrase's pseudo-document; or
2. $\text{SimTFIDF}(\text{ph}, d) = \text{Vec}_{TFIDF}(\text{WebQE}(\text{ph})) \cdot \text{Vec}_{TFIDF}(d)$, where the term-weighting function is the TFIDF formula in Equation (1) above; or
3. $\text{SimKEX}(\text{ph}, d) = \text{Vec}_{KEX}(\text{WebQE}(\text{ph})) \cdot \text{Vec}_{KEX}(d)$, where the term-weighting function is KEX.

Among these functions, SimBin is the simplest and the inner-product can be reduced to set operations. By comparison, SimKEX is the most complex but potentially has a better term-weighting function because information other than TF and DF is also used.

Map Relevance Scores to Probabilities

Although the similarity measures obtained per the functions above can be used as ranking functions to judge the relevance between the target phrase and document, these real-valued numbers, despite being between 0 and 1, are poorly calibrated and do not serve well as relative probabilities. A sigmoid function is used to map the real-valued output f of the model to posterior probabilities:

$$P(y=1|f) = 1/(1+\exp(\alpha f + \beta)), \quad (2)$$

where $\alpha$ and $\beta$ are parameters tuned using the maximum likelihood estimation from a training dataset. For additional details on sigmoid functions see "Probabilities for support vector machines" in *Advances in Large Margin Classifiers* (J. Platt et al., MIT press, 2000). A sigmoid function is an s-shaped, differentiable, strictly increasing function. If not specified differently, it is the logistic function used here. Other types of sigmoid functions include the hyperbolic tangent function and the arc-tangent function. Note that the scaling described therein was originally designed for Support Vector Machines (SVMs) where f is the margin and plays a similar role of the log odds. The same function of log odds can be used to map the raw score $s \in [0, 1]$ to f when applying this monotonic transformation:

$$f=\log(s)/\log(1-s) \qquad (3)$$

Note that to avoid numerical error when s is 0 or 1, $\epsilon$ or $1-\epsilon$ may be used instead, respectively, where $\epsilon$ is a very small number.

Combine Multiple Relevance Scores

Because the sigmoid function of Equation 2 is a monotonic function, using it to map the original relevance scores to probabilities does not change their relative ordering. Although the quality of the probability estimation will be improved, other ranking metrics such as precision or Area Under Curves (AUC) will remain the same. However, this function form can also be used as tool to combine multiple similarity-based methods (e.g., SimBin, SimTFIDF and SimKex) and improve the ranking as well.

Suppose there are m relevance scores, $s_1, s_2, \ldots, s_m$, output by different similarity-based methods. Let $f_1, f_2, \ldots, f_m$ be the values after mapping these scores using Equation 3. Namely, $f_i = \log(s_i)/\log(1-s_i)$. The probability is computed using a similar sigmoid function:

$$P(y=1|f_1,f_2,\ldots,f_m)=1/(1+\exp(\Sigma_i^m \alpha_i f_i + \beta)), \qquad (4)$$

where $\alpha_i$ and $\beta$ are the parameters to learn.

Because the parameter space is small, standard gradient descent methods can be used as the learning method. This method, denoted SimCombine, can be used to combine the three similarity-based methods described above.

Regression Approaches

The regression-based approaches (for example FIG. 4) described next are based on an assumption that if an out-of-document phrase is semantically similar to an in-document phrase, then relevance scores of the in and out-of document phrases should be close to each other. With this in mind, an in-document phrase relevance measure, such as KEX, is applied to the target document to get a list of top N keywords, associated with the relevance scores. A judgment is made as to whether an out-of-document phrase is similar to these top in-document phrases and corresponding scores that are consistent are predicted. This is done through regression. Each phrase $ph_i$ extracted by the in-document relevance measure is represented by a sparse term vector via query expansion $x_i = \text{Vec}(\text{WebQE}(ph_i))$, as well as the target phrase, denoted by $ph_{N+1}$ and $x_{N+1} = \text{Vec}(\text{WebQE}(ph_{N+1}))$. Correspondingly, the relevance scores of these in-document phrases are denoted as $y_1, \ldots, y_N$. Given the N pairs of $(y_i, x_i)$ derived from the N in-document phrases and their scores, the goal is to predict $y_{N+1}$, which is the relevance score of the target phrase $ph_{N+1}$. Gaussian Process Regression is used as the regression model. A short explanation of Gaussian Process Regression is provided next, followed by a description of how it is used.

Gaussian Process Regression

Gaussian Process Regression (GPR) is a nonparametric model that uses a Gaussian Process (GP) as the prior probability distribution over a function space. A GP is a stochastic process y(x) over a multi-dimensional input space x that has the following defining property: for any finite selection of points $x_1, x_2, \ldots, x_N$, the corresponding marginal density $P(y(x_1), \ldots, y(x_N))$ is a (multi-variate) Gaussian. A GP is fully described by two statistics: the mean $\mu(x)$ and the covariance (i.e., kernel) function on each pair of examples $K(x, x')$. Because a random phrase that does not appear in the document tends to be irrelevant to the document, it is assumed that the GP over the relevance function has a zero mean.

To use GPR, the kernel function and the Gaussian noise term are specified. Given N examples and their observed values $(y_1, x_1), \ldots, (y_N, x_N)$, and the testing example $x_{N+1}$, the predicted mean value for $y_{N+1}$ is $$y_{N+1} = k^T(K+\sigma_n^2 I)^{-1} y,$$

where k is the vector of covariances (given by the specified kernel function $K(x_{N+1}, x_i)$) between the test example $x_{N+1}$ and the N training examples, K is the N-by-N covariance matrix, where each element (i, j) is $K(x_i, x_j)$, y is the vector of N observed values $y_1, y_2, \ldots, y_N$, and $\sigma_n^2$ is the variance of the Gaussian noise. The computational complexity of solving this equation is $O(N^3)$ for the matrix inversion.

Kernel Functions

While many kernel functions can be used, three common ones are suggested: linear kernel, polynomial kernel, and radial basis kernel. Given two vectors x and x', the linear kernel function is the inner product of these vectors plus a bias term:

$$K(x,x') = x \cdot x' + \sigma_0^2$$

For simplicity, $\sigma_0^2$ may be set to 0, which makes this kernel function a homogeneous linear kernel.

The polynomial kernel can be expanded to a positive-integer power of linear kernel:

$$K(x,x') = (x \cdot x' + \sigma_0^2)^p$$

where p is a positive-integer. Note that a polynomial kernel function maps the original vector into a higher dimensional space, where the parameter p decides the degree. Since polynomial kernels are effective in high-dimensional classification problems, if this kernel function is used the bias term $\sigma_0^2$ can be set to 0.

Unlike linear and polynomial kernels, a radial basis kernel function (RBF) is an exponential function that takes the difference of the two input vectors with some scaling: $K(x, x') = \exp(-|x-x'|^2/\sigma^2)$. An RBF kernel has the effect of mapping the original vector into an infinitely high dimensional space. This kernel can be used with several different scaling parameters.

CONCLUSION

Explained above are two approaches for providing consistent relevance measures for both in and out-of document phrases. For similarity-based methods, different configurations may be used and combined using a sigmoid function, perhaps outperforming individual methods. When a well-chosen kernel function and term-weighting scheme are used, the Gaussian Process Regression model may produce superior results. The approaches may be implemented on one or more computing devices such as shown in FIG. 5. A computing device 250 may have a CPU and storage and may provide video output to a display 252. The computing device 250 may communicate via a network, for example to provide or receive a query term or to access Web documents or a search engine. Embodiments and features of the approaches discussed above can be realized in the form of information stored in volatile or non-volatile computer or device readable media (for example the storage of computing device 250). This is deemed to include at least media such as optical storage (e.g., CD-ROM), magnetic media, flash ROM, or any other means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded, possibly compiled or interpreted, and executed. The embodiments and features can be performed on any type of computing device, including portable devices, workstations, servers, mobile wireless devices, and so on.

The invention claimed is:

1. One or more computer readable media, not comprising a signal, storing information to enable a computing device to perform a process of predicting a probability that an input out-of-document phrase that is not in a document is relevant to the document, the process comprising:
applying an in-document phrase relevance measure to the target document to get a list of in-document keywords in the document and respective associated probabilities of relevance, to the document, of the in-document keywords;
representing each in-document keyword as a respective term vector, each term vector computed by expansion of it corresponding in-document keyword, wherein each in-document keyword has a respective term vector and probability;
computing a term vector for the out-of-document phrase by performing term expansion on the out-of-document phrase, terms of the term vector for the out-of-document phrase having respective weights; and
using a regression model to predict the probability of relevance, to the document, of the out-of-document phrase, wherein the regression model uses the term vectors and probabilities of the in-document keywords, respectively, and uses the term vector of the out-of-document phrase to predict the probability of relevance of the out-of-document phrase, wherein the probability of relevance of the out-of-document phrase is consistent with the probabilities of the in-document keywords.

2. One or more computer readable media according to claim 1, wherein a query expansion procedure is used to generate the term vectors for the in-document keywords and to generate the term vector for the out-of-document phrase.

3. One or more computer readable media according to claim 2, wherein the query expansion procedure treats an input term as a search query and then uses results of executing the search query to represent the input term as a set of semantically related words.

4. One or more computer readable media according to claim 3, wherein the input term is mapped to a pseudo document by obtaining documents returned by a search engine that received the search query.

5. One or more computer readable media according to claim 1, wherein the probabilities of the in-document keywords are used as training data to train the regression model.

6. A method, performed by one or more computing devices comprised of processing hardware and storage hardware, of measuring a probability that an out-of-document phrase is relevant to a document that does not contain the out-of-document phrase, the method comprising:

receiving as input the out-of-document phrase, the out-of-document phrase not present in the document, the document stored in the storage hardware;
extracting, by the processing hardware, in-document phrases from the document and computing probabilities that the in-document phrases are relevant to the document, respectively, wherein the in-document phrases comprise phrases in and extracted from the document, wherein the probabilities are computed according to the in-document phrases and the document and wherein each probability of an associated in-document phrase corresponds to predicted relevance of the in-document phrase to the document, and storing the in-document phrases and the respective probabilities thereof in the storage hardware;
representing the in-document phrases as respective term vectors stored in the storage hardware, each term vector for an in-document phrase comprising elements, wherein each term element comprises a term and a weight value computed for the term based on the term and the document, and wherein each in-document phrase has a corresponding term vector and a corresponding probability;
representing the out-of-document phrase as a term vector, stored in the storage hardware, comprised of elements, where each element comprises a term related to the out-of-document phrase and a weight value computed for the term;
using, by the processing hardware, a regression model to compute, and store in the storage hardware, the probability of relevance of the out-of-document phrase based on the term vectors of the in-document phrases, based on the probabilities of the in-document phrases, and based on the term vector of the out-of-document phrase, wherein the probabilities of the in-document phrases are consistent with the probability of relevance of the out-of-document phrase.

7. A method according to claim 6, further comprising using the term vectors of the in-document phrases and their computed probabilities to train the regression model.

8. A method according to claim 7, the wherein the regression model comprises a Gaussian Process Regression model.

9. A method according to claim 6, wherein the probabilities of the in-document phrases are generated by a keyword extraction algorithm applied to the document.

10. A method according to claim 9, wherein kernel functions are used for the regression model, and respective weights of the kernel functions, which are for linearly combining the kernel functions, are trained using a dataset.

11. A method according to claim 6, wherein using the regression model comprises using the in-document term vectors to train the regression model.

12. One or more computer readable storage media wherein the storage media is not a signal, the storage media storing information to enable a computing device to perform a process of predicting a probability that an input out-of-document phrase that is not in a document is relevant to the document, the process comprising:
extracting keywords from the document;
applying an in-document phrase relevance measure to the target document and the keywords to obtain relevancies of the keywords, respectively to the document, wherein the in-document phrase relevance measure maps, according to the document, keywords to respective relevance scores, the relevance scores indicating relevancies of the keywords to the document;

forming the keywords and their relevance scores into a first term vector where each element of the first term vector comprises a keyword and its relevance score;

performing term expansion on the out-of-document phrase to form a second vector comprised of elements, each element thereof comprising a term related to the out-of-document phrase and having a weight corresponding to similarity to the out-of-document phrase; and using a regression model for the first term vector and the second term vector, to compute the probability that the out-of-document phrase is relevant to the document such that the probability is consistent with the probabilities of relevancies of the keywords to the document.

13. One or more computer-readable storage media according to claim 12, wherein the term expansion is performed by a query term expansion algorithm that treats the phrase as a query and expands terms of the phrase to similar query terms.

* * * * *